Patented June 7, 1927.

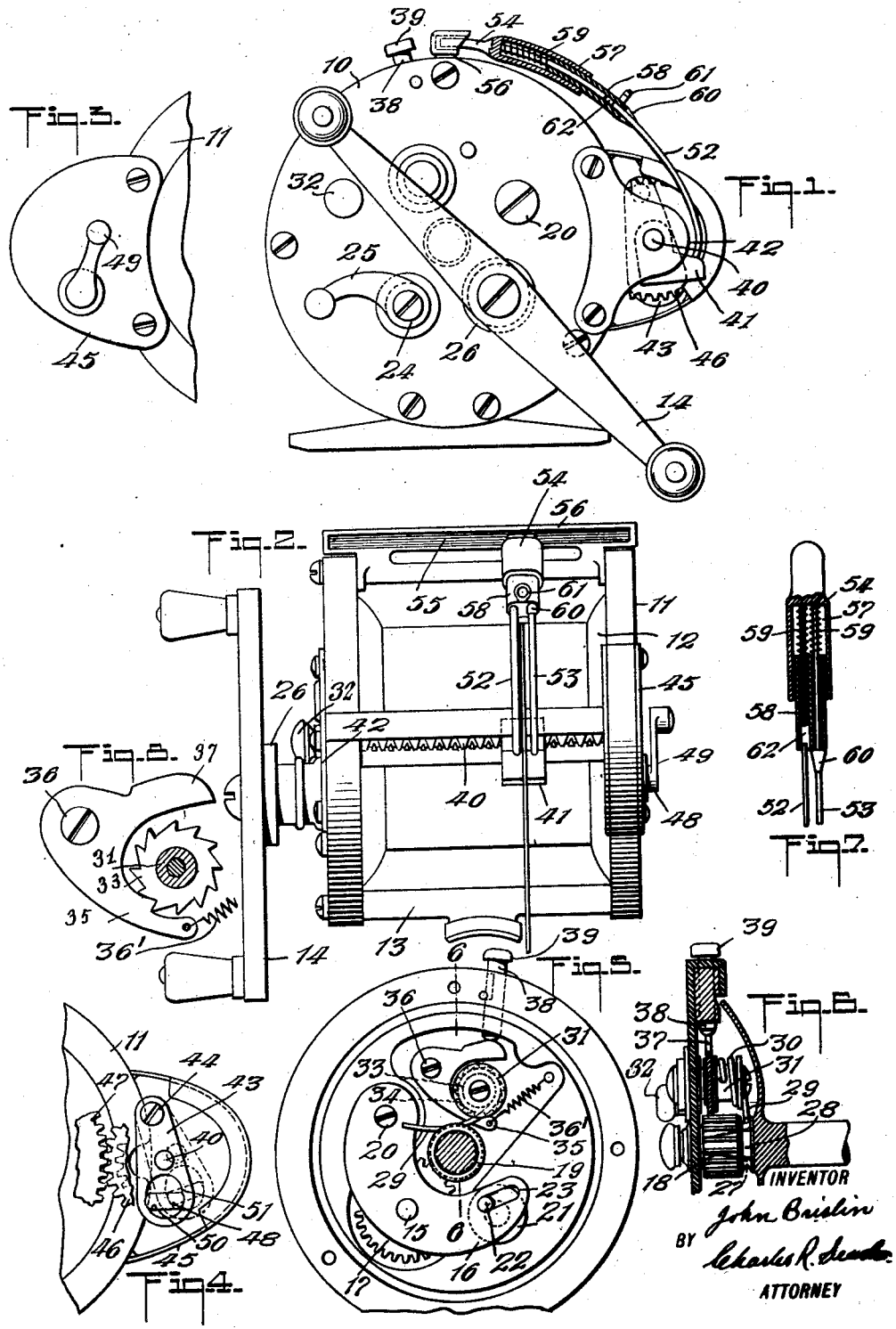

1,631,790

UNITED STATES PATENT OFFICE.

JOHN BRISLIN, OF BROOKLYN, NEW YORK.

FISHING REEL.

Original application filed February 8, 1926, Serial No. 86,772. Divided and this application filed December 11, 1926. Serial No. 154,064.

The invention relates to multiplying reels and more particularly to reels of the level-winding type, and the object of the invention is to provide means whereby the spool may be freed from the winding gear, and also from the level-winding mechanism so as to be entirely free for casting.

Another important object is to provide simple, easily operated means for disengaging the free length or unwound portion of the line from the level-winding mechanism, and for re-engaging it with such mechanism when desired.

A further object is to provide a yielding brake acting positively upon the spool-shaft, the tension of which is easily controlled and having means for the instantaneous release of the brake pressure.

The invention consists in certain novel features and details of construction by which the above objects are attained, to be hereinafter described and claimed.

The accompanying drawings form a part of this specification and show an approved form of the invention.

Figure 1 is a side elevation of the improved reel, with a portion of the line laying mechanism shown in vertical section.

Figure 2 is a front elevation of the reel.

Figure 3 is an elevation showing an extension of one of the side plates of the reel, and the crank or operating lever thereon for throwing the level-winding mechanism into or out of mesh.

Figure 4 is a corresponding view of the inner face of such extension and the mechanism carried thereby.

Figure 5 is an elevation of the inner face of the main side plate of the reel, and the mechanism carried thereon, with the spool-shaft shown in vertical transverse section.

Figure 6 is a vertical section through certain portions of the parts shown in the preceding figure, partly in elevation, the plane of section being indicated approximately by the line 6—6 in Figure 5.

Figure 7 is a sectional plan showing a portion of the line-laying or level-winding mechanism.

Figure 8 is an elevation, partly in section showing certain portions of the brake mechanism on a larger scale.

Similar reference numerals indicate the same parts in all the figures.

The side plate is marked 10, the opposite plate 11, the spool 12, and the cross-pillars 13. The spool is rotated to wind the line by crank 14 on a winding sleeve loosely mounted on a stud 15 fixed upon a lever 16, and carries a gearwheel 17 adapted to mesh with a pinion 18 on the spool-shaft 19, see Figures 5 and 6. The lever 16 is mounted to swing on a screw 20 and thus move the gearwheel 17 into or out of mesh with the pinion 18. This movement is effected by partially rotating a disk 21 mounted in the plate 10, having an eccentrically located pin 22 engaged in a slot 23 in the free end of the lever 16. The disk 21 is fixed to a short shaft 24 extending through the plate 10 and is oscillated by an arm 25 on the exterior of the plate.

The housing 26 for the stud 15 and its sleeve, not shown, is hollowed sufficiently to permit this swinging movement of the lever 16. This mechanism permits the spool 12 to be freed from or engaged with the sleeve and its crank 14.

On the spool-shaft is a tapered portion 27 between the pinion 18 and the adjacent spool-flange, shown in dotted lines in Figure 6, on which is loosely mounted a circumferentially grooved collar 28 receiving in its groove a finger or extension 29 of a wire spring 30 wound upon a drum 31 adapted to be partially rotated by a knob 32 on the exterior of the main plate 10, by which the pressure of the finger is positively applied, and the tension of the spring 30 may be varied and the pressure of the finger 29 upon the loose collar 28 correspondingly varied, whereby the frictional engagement of the loose collar with the tapered portion 27 of the spool-shaft 15 is increased or diminished.

The drum 31 carries a ratchet wheel 33, see Figures 5 and 6, the teeth of which are engaged by a detent 34 on the arm 35 of a V-shaped lever arranged to swing on a screw 36 secured to the plate 10. Attached to the end of the lever-arm 35 is a spring 36' tending to hold the detent in engagement with the ratchet and thus hold the drum 31 against rotation in the direction to unwind the spring and lessen the tension of the brake. The other arm 37 of the lever lies in the path of a radially movable stud 38 extending through the rim of the plate 10 and terminating in a knob 39.

Pressure on the knob 39 swings the lever in opposition to the force of the contractile spring 36 which movement withdraws the detent 34 and frees the drum 31, thus relieving the pressure of the finger 29 upon the grooved loose collar 28.

The shaft 40 of the level-winding mechanism has the usual double thread engaged by the usual nut 41 arranged to traverse back and forth thereon, and is rotatably mounted at one end in a fixed bearing in a plate 42 secured to and which may be a part of the main side-plate 10. The other end of the screw-shaft 40 revolves in a bearing in a lever 43 mounted to swing on a screw 44 set in the housing or plate 45 attached to the opposite side-plate 11.

The screw-shaft carries a large pinion 46 adapted to mesh with a large gearwheel 47 on the spool-shaft. The pinion 46 may be swung into or out of mesh with the gearwheel 47 by swinging the lever 43 in one direction or the other; this movement of the lever is effected by the partial rotation or oscillation of a short shaft or stud 48 mounted in the housing 45, having on its outer end an exterior crank 49 and on its inner end a radial arm 50 engaged in an opening 51 of peculiar form in the lever 43, see Figure 4, of such shape as to allow the arm 50 to be swung through about a half circle, with the end of the arm 50 acting upon the side walls of the opening 51 in such movement and thereby swinging the lever and locking it in position at the end of such swing in either direction.

On the nut 41 is mounted a pair of upwardly extending curved guide wires 52 and 53 arranged parallel with each other, terminating in a tongue 54 received in a long recess 55 in a cross member 56 joining the plate 10 to the plate 11 and serving to guide the end of the tongue in its traverses.

The lower portion of the tongue 54 is hollowed as at 57 in Figure 7 to receive a slide 58 having twin openings inclosing the guide wires 52 and 53 and slidable on the latter. Springs 59 on the wires within the tongue exert their force in the direction to hold the slide downwardly against a stop 60 on the wire 53. The slide 58 has a projection 61 by which it may be moved upwardly upon the guide wires in opposition to the springs. The wire 52 is cut to form a short opening or gap 62 normally covered by the slide 58 but which can be exposed by thrusting the slide upwardly. When thus moved the fishing line lying in the space between the guide wires may be removed from the level-winding mechanism or re-engaged therewith as desired.

In making a light cast the spool may be entirely freed by first moving the nut 41 to the extreme right, in Figure 2, then throwing the crank 49 in the direction to move the large pinion 46 out of mesh with the large gearwheel 47, thus causing the level-winding mechanism to remain idle, next moving the slide 58 to uncover the gap 62 and passing the line through the gap, then by moving the lever 16 to throw the gearwheel 17 out of mesh with the pinion 18 and then pressing the knob 39 inwardly to release the brake, if the latter has been applied; the cast may then be made with the spool free, checked only by the pressure of the thumb on the spool at the end of the cast as usual. The line is then passed through the gap 62 to lie again between the guide wires 52, 53, the crank moved to bring the level-winding mechanism into operation, the lever 16 thrown to bring the gearwheel 17 into mesh with the pinion 18 so that the line may be rewound, with the brake applied if desired.

The features of releasing the line from the level-winding mechanism and holding the latter idle permits the reel to be used in the ordinary manner when required, and the means for easily and delicately adjusting the brake tension and for its instantaneous release offer advantages readily understood and appreciated by the rod-and-reel angler.

No claim is made herein to the line-traversing means herein shown and described, as the same is claimed in my co-pending application, Serial No. 86,772, filed February 8, 1926, of which this is a division.

I claim:

1. In a reel, a spool-shaft and means for rotating it, a collar loosely mounted on said spool-shaft, a stud, means on the exterior of the reel for partially rotating said stud, a spring coiled upon and secured at one end to said stud and having a finger arranged to press frictionally upon said collar, a ratchet wheel on said stud, and a spring-actuated detent adapted to engage said ratchet wheel.

2. In a reel, a spool-shaft and means for rotating it, a collar loosely mounted on said spool-shaft, a stud, an arm on the exterior of the reel for partially rotating said stud, a spring coiled upon and secured at one end to said stud and having a finger arranged to press frictionally upon said collar, a ratchet wheel on said stud, a spring-actuated detent adapted to engage said ratchet wheel, and means operable from the exterior of the reel for moving said detent out of engagement with said ratchet wheel.

3. A reel brake comprising a spool-shaft, a collar loosely mounted on said shaft, a stud, an arm on the exterior of the reel for partially rotating said stud, a spring coiled upon and secured at one end to said stud and having a finger arranged to press frictionally upon said collar, a ratchet wheel on said stud, a lever, a detent thereon adapted to engage said ratchet wheel, a spring acting on said lever to hold said detent yieldingly in such engagement, and a slidable pin extending to the exterior of the reel, adapted to press upon said lever and move said detent out of such engagement.

In testimony that I claim the invention above set forth, I affix my signature hereto.

JOHN BRISLIN.